United States Patent [19]

Mueller

[11] Patent Number: 4,803,299

[45] Date of Patent: Feb. 7, 1989

[54] PREPARATION OF POLYTETRAMETHYLENE ETHER GLYCOL DIESTERS HAVING A LOW COLOR NUMBER

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 34,832

[22] Filed: Apr. 6, 1987

[30] Foreign Application Priority Data

Apr. 18, 1986 [DE] Fed. Rep. of Germany ....... 3613106

[51] Int. Cl.$^4$ ............................................. C07C 67/24
[52] U.S. Cl. ................................... 560/240; 560/252; 568/617; 528/408
[58] Field of Search ................ 528/408; 560/240, 252; 568/617

[56] References Cited

U.S. PATENT DOCUMENTS

| | | | |
|---|---|---|---|
| 2,751,419 | 6/1956 | Hill, Jr. et al. | 568/617 |
| 3,454,652 | 7/1969 | Dunlop et al. | 528/408 |
| 3,935,252 | 1/1976 | Tomomatsu | 568/617 |
| 3,980,672 | 9/1976 | Tomomatsu | 549/429 |
| 4,189,566 | 2/1980 | Mueller et al. | 528/408 |
| 4,480,124 | 10/1984 | Mueller | 560/248 |
| 4,525,580 | 6/1985 | Baker | 528/490 |

FOREIGN PATENT DOCUMENTS

| | | |
|---|---|---|
| 104609 | 4/1984 | European Pat. Off. . |
| 61668 | 6/1985 | European Pat. Off. . |
| 2916653 | 11/1980 | Fed. Rep. of Germany . |

*Primary Examiner*—Donald B. Moyer
*Assistant Examiner*—Bruce D. Gray
*Attorney, Agent, or Firm*—John H. Shurtleff

[57] ABSTRACT

Polytetramethylene ether glycol diesters having a low color number are prepared by catalytic polymerization of tetrahydrofuran in the presence of a carboxylic anhydride, a bleaching earth and from 2 to 0.2% by weight, based on the tetrahydrofuran, of an alkylene oxide.

14 Claims, No Drawings

PREPARATION OF POLYTETRAMETHYLENE ETHER GLYCOL DIESTERS HAVING A LOW COLOR NUMBER

The present invention relates to a process for the preparation of polytetramethylene ether glycol diesters having a low color number by polymerization of tetrahydrofuran in the presence of a carboxylic anhydride and of an alkylene oxide over a bleaching earth catalyst.

Although a very wide variety of catalysts have been proposed (EP-B-61 668, page 2, lines 4 to 18) for the polymerization of tetrahydrofuran to obtain polytetramethylene ether glycol or the corresponding diesters, only a few catalysts are suitable for the preparation of polymers which meet the market requirements with regard to the chemical and physical properties.

However, one disadvantage of these catalysts, which as such are advantageous, is that they generally give a polymer which has a slight to pronounced yellow or brown color. The higher the temperature chosen for polymerization of the tetrahydrofuran, the deeper is the discoloration of the polymers. Moreover, the quality of the tetrahydrofuran also plays an important role.

Technical-grade tetrahydrofuran contains small amounts of impurities in a concentration of 10-500 ppm. The chemical nature of these impurities is not completely known. Although this tetrahydrofuran is very pure, usually having a purity of >99.9%, these trace impurities apparently give rise to the abovementioned discoloration during the polymerization. Simultaneously with the discoloration, a change in reactivity is also observed during the preparation of polyesters or polyurethanes from the polytetramethylene ether glycol. These are serious shortcomings, since color and reproducible processing are important properties of a polymer which is to be used industrially.

U.S. Pat. Nos. 3,980,672, 3,935,252 and 2,751,419 and German Laid-Open Application DOS 2,801,792 (U.S. Pat. No. 4,189,566) describe methods for converting technical-grade tetrahydrofuran into a polymerizable monomer by pretreatment with zeolitic molecular sieves, strong mineral acids, organic sulfonic acids, silica gel or bleaching earths. While the treatments described in the U.S. patents essentially have the result that the polymers obtained from the tetrahydrofuran thus treated do not have a residual acid number which cannot be eliminated, the bleaching earth treatment described in German Laid-Open Application DOS 2,801,792 gives polymers having an improved color number. However, we have found that these methods of treatment cannot be used in a reproducible manner for every industrial grade of tetrahydrofuran available commercially. The processes according to the abovementioned U.S. Patents also have the disadvantage that the unconverted tetrahydrofuran has to be carefully dried and purified before being reused, since it originates from a procedure in which the polymer is worked up in the presence of water. U.S. Pat. No. 4,525,580 describes a treatment with aqueous sodium hypochlorite solution for improving the color, this treatment likewise being difficult.

According to EP-B-61 668, polytetramethylene ether glycols or polytetramethylene ether glycol diesters having a low color number are prepared by subjecting the polymers obtained by cationic polymerization of tetrahydrofuran to treatment with hydrogen in the presence of a hydrogenation catalyst. This subsequent decolorization method is expensive because it requires special apparatuses and a separate process step. The catalysts required are expensive and, depending on the quality of the polytetrahydrofuran to be removed, may have a short life. The same applies to purification of the polymer by treatment with active carbon to effect decolorization, as described in, for example, U.S. Pat. Nos. 3,935,252 or 2,751,419. This process too requires expensive apparatus and entails additional significant costs arising from the use of the active carbon, which has only a limited purification capacity.

Tetrahydrofuran apparently contains various impurities which result in discoloration of the end products. These impurities have not been identified in most cases. Hence, it is not always possible to predict by means of analysis whether the quality of the tetrahydrofuran used will be suitable for the polymerization, so that, for example, the polymer obtained will not be to specification despite the fact that the monomer has been pretreated. For large-scale industrial production of polytetrahydrofuran, it is therefore necessary to provide a measure, in terms of process engineering and apparatus, so that spoilage can reliably be avoided.

It is an object of the present invention to provide a polymerization process for tetrahydrofuran which permits the monomer containing the stated impurities to be used without it being necessary to take an additional subsequent measure to reduce the color number.

We have found that, in the catalytic polymerization of tetrahydrofuran in the presence of a carboxylic anhydride and a bleaching earth, polytetramethylene ether glycol diesters having the desired low color number are obtained if the polymerization is carried out in the presence of from 2 to 0.2% by weight, based on the tetrahydrofuran, of a 1,2-alkylene oxide.

The novel process can be carried out using commercial-grade tetrahydrofuran. Whether the tetrahydrofuran was prepared from acetylene and formaldehyde, maleic anhydride, allyl alcohol or butadiene is of no importance. In every case, it can be converted, by the process of the invention, to polytetramethylene ether glycol diesters having color numbers of <20 APHA (according to DIN 53,409, July 1967).

In the process according to the invention the copolymerization is carried out in the presence of an organic carboxylic anhydride as a promoter. Advantageously used carboxylic anhydrides are those which are derived from aliphatic or aromatic poly- and/or preferably monocarboxylic acids of 2 to 12, preferably 2 to 8, carbon atoms. Specific examples are butyric anhydride, valeric anhydride, caproic anhydride, caprylic anhydride, pelargonic anhydride, acrylic anhydride and preferably propionic anhydride and acetic anhydride. Since the polytetramethylene ether glycol diesters prepared according to the invention can be converted to the appropriate glycols for most applications, carboxylic anhydrides containing a small number of carbon atoms are preferably used in practice. Because it is cheaper and readily available acetic anhydride is preferred. Mixed anhydrides and mixtures of the abovementioned anhydrides can of course also be used. The carboxylic anhydride is used, for example, in amounts of from 1.5 to 15% by weight, based on the tetrahydrofuran.

Bleaching earths which are used as cationic catalysts for the polymerization are described in, for example, Ullmann's Enzyklopädie der technischen Chemie, 3rd edition, volume IV, pages 541-545. Synthetic bleaching earths are described in, for example, British Pat. No. 854,958. Essentially anhydrous bleaching earths which are obtained from the commercial, hydrated bleaching earths by drying at from 100° to 200° C. under atmospheric or reduced pressure are preferably used. The water content should be, in particular, less than 0.1% by weight and should not exceed 0.2% by weight.

The bleaching earth can be used in suspended form or as a fixed catalyst bed. This can be achieved, for example, by a method in which the starting mixture for the polymerization flows through the fixed catalyst bed in a tube reactor.

Suitable catalyst moldings are prepared, for example, by kneading the commercial hydrated bleaching earths with binders, in particular water, and pressing the mixture to give moldings. The hydrated moldings are then dried at above 100° C., preferably from 150° to 700° C., under atmospheric or reduced pressure, in the presence or absence of gases which are inert under the reaction conditions, for example noble gases, such as helium or argon, or in particular nitrogen, to give the abovementioned water contents.

The 1,2-alkylene oxides can be unsubstituted or substituted. Suitable substituents are straight-chain or branched alkyl of 1 to 6, preferably 1 or 2, carbon atoms, phenyl, and alkyl and phenyl radicals which are substituted by alkoxy of 1 or 2 carbon atoms or by halogen. For practical reasons, ethylene oxide and propylene oxide are preferred. Ethylene oxide is particularly suitable since it has the greatest color-lightening action when added in very small amounts. The alkylene oxide is used in amounts of from 2 to 0.2, preferably from 1.5 to 0.5, % by weight, based on the tetrahydrofuran. The manner in which these small amounts of alkylene oxide produce the color-reducing effect is not known. What happens to the alkylene oxides used in such small amounts in the course of the polymerization is also unknown. It was not possible to detect alkylene oxide in the finished polymerization batches or in fragments of the polymer which are obtained, for example, in the cationic depolymerization of the polytetrahydrofuran.

According to German Laid-Open Application DOS 2,916,653 and EP-A-104 609 (cf. page 8, lines 29-30), the molecular weight of the resulting polytetrahydrofuran is determined by the tetrahydrofuran/anhydride ratio. The higher the chosen concentration of the acetic anhydride, the lower is the molecular weight of the resulting polymer. In contrast, the amount of ethylene oxide used for the process of this invention has no effect on the molecular weight. Such an effect apparently does not exist in this case. As described in, for example, Houben-Weyl, Methoden der organischen Chemie, volume VI/3, page 482 (1965), 1,2-alkylene oxides and carboxylic anhydrides react very readily and at high reaction rates, in particular in the presence of catalysts, with the formation of the diesters of carboxylic acids with 1,2-diols. It was therefore to be expected that diesters of this type would have a colorlightening effect. However, it was not possible to prepare polytetrahydrofuran having a low color number by controlled use of these esters.

In the process according to the invention polymerization is advantageously carried out at from 30° to 70° C., preferably from 40° to 60° C., under atmospheric pressure. The reaction times required to reach equilibrium in the polymerization are from 5 to 20 hours, depending on the reaction temperature used. At the polymerization equilibrium, conversions of tetrahydrofuran of from 35 to 60% by weight are achieved, depending on the polymerization temperature. The reaction equilibrium is furthermore determined by the ratio of carboxylic anhydride to tetrahydrofuran. The higher conversion corresponds to higher carboxylic anhydride concentrations.

Since, at equilibrium, the reaction mixture contains, in addition to the polytetramethylene ether glycol diesters prepared according to the invention and having a low color number, essentially only unconverted tetrahydrofuran, the latter can be separated off readily by distillation under atmospheric or reduced pressure and, if desired, recycled to the reaction. In certain circumstances, it may be advisable to subject the tetrahydrofuran evaporated off to fractional distillation in order to remove the high boilers and low boilers present therein in small amounts.

The polytetramethylene ether glycol diesters obtained by the process of the invention are tetrahydrofuran polymers having a degree of polymerization >2. A low color number means that the polytetramethylene ether glycol diesters or polytetramethylene ether glycols prepared according to the invention have a HAZEN color number (APHA method) of, for example, <35, preferably <20 HAZEN. The determination of these color numbers is described in the standards DIN 53,409 and ASTM-D-1209.

The diesters of polytetramethylene ether glycols with carboxylic acids, which esters are prepared according to the invention and have a low color number, can be converted to the corresponding glycols in a conventional manner by hydrolysis, for example by treatment with calcium oxide and/or hydroxide as a catalyst or, preferably, by transesterification, for example with methanol, in a manner similar to that described in U.S. Pat. No. 2,499,725 or J. Amer. Chem. Soc. 70, page 1842.

The resulting polyoxybutylene glycols, in particular those having molecular weights of from 250 to 3000, are very useful for the preparation of polyurethanes or polyesters having little or no intrinsic color. They impart good mechanical properties to the structural materials produced from them, so that they can be used, in particular, for demanding applications.

The advantageous result of the process of the invention is surprising. In the process described in EP-B104 609, tetrahydrofuran is copolymerized with alkylene oxides in the presence of carboxylic anhydrides, the starting mixtures containing from 50 to 5, preferably from 33 to 10, % by weight of alkylene oxide. This procedure gives copolymers containing different amounts of alkylene oxide units. However, the copolymers obtainable by this known process have extremely low color numbers only when the tetrahydrofuran used has been pretreated, prior to the polymerization, with strong mineral acids, organic sulfonic acids, silica gel or bleaching earths by the method described in EP-B-3112. However, discolored copolymers may be obtained in this case too unless, when the polymerization mixtures are worked up, care is taken to ensure that the catalyst is separated off in the absence of air. It therefore could not be foreseen that when such small amounts of alkylene oxide and, technicalgrade tetrahydrofuran without any pretreatment were employed and extremely anerobic working conditions were dispensed with, polymers having extremely low color numbers would be obtained. In particular, it is not clear why the use of low alkylene oxide concentrations results in polymers having better color properties compared with the copolymerization using relatively high alkylene oxide concentrations.

Another advantage of the novel process is that polymerization can now be carried out at a higher temperature than otherwise usual, and hence at a higher reaction rate. The color of the resulting polymers depends, inter alia, on the polymerization temperature chosen. The higher the temperature selected, the more pronounced the discoloration of the products obtained. However, since discoloration of the polymer is avoided in the novel polymerization, polymerization can now be effected at a higher temperature. This in turn results in a higher reaction rate and a narrower molecular weight distribution of the polymer.

In the Examples which follow, parts are by weight. The parts by weight bear the same relation to parts by volume as that of the kilogram to the liter.

EXAMPLES 1 TO 6

Commercial technical-grade tetrahydrofuran is used for the polymerization either in untreated form or after the purification described in EP-A 3 112.

Extrudates having a diameter of from 2 to 3 mm and a mean lenght of 4 mm are prepared from commercial bleaching earth (R) Tonsil Optimum FF from Südchemie AG, Munich) and dried for 8 hours at 200° C.

500 parts by volume of the bleaching earth extrudates and, in the absence of air, a solution of 300 parts of tetrahydrofuran, 18 parts of acetic anhydride and various amounts (as stated in the Table) of ethylene oxide are introduced into a polymerization vessel. The polymerization mixtures are thermostated at 50° C. for 9 hours, after which the reaction mixtures are poured off from the catalyst. The results obtained are shown in the Table.

The polymers are dissolved in the same amount of methanol and, after the addition of 0.01% by weight of sodium methylate, are transesterified to the corresponding glycol by distilling off the methyl acetate/methanol azeotrope at 54°–55° C. under atmospheric pressure in a column. The polytetramethylene ether glycol obtained has a molecular weight of 1000. The color numbers of the glycols correspond to those of the esters. Analysis of the volatile components of the resulting reaction mixture does not give any indication of the presence of ethylene oxide. The $^{13}C$ NMR spectrum of the polymethylene ether glycol gives no indication of the presence of C 2 units of ethylene oxide in the polymer. If the polymer is depolymerized at 160° C. using bleaching earth as a catalyst, the tetrahydrofuran obtained is scarcely contaminated at all. Using gas chromatography, it is not possible to detect in this tetrahydrofuran a dioxane concentration corresponding to the amount of ethylene oxide used.

EXAMPLES 7 TO 11

The procedure described in Examples 1 to 6 is followed, except that a solution which consists of 300 parts of tetrahydrofuran, 8.1 parts of acetic anhydride and the amount of ethylene oxide stated in the Table is used for the polymerization. A polytetrahydrofuran having a molecular weight of 2000 is obtained. The results of the polymerization experiments as a function of the amount of ethylene oxide employed are shown in the Table.

If the experiments are repeated but the ethylene oxide is replaced with the same amount of propylene oxide, polymers having the color numbers shown in brackets in the color number column of the Table are obtained.

TABLE

| Example | Ethylene oxide % by weight | THF conversion % by weight | HAZEN color no. of the PTMEG[1] | Note on THF quality |
| --- | --- | --- | --- | --- |
| 1 (comp.) | 0.0 | 53 | 80 | Commercial, product, untreated |
| 2 (comp.) | 0.0 | 54 | 40 | Commercial product treated according to EP-A 3112 |
| 3 | 0.2 | 52 | 25 | Commercial product, untreated |
| 4 | 0.4 | 53 | 5–10 | Commercial product, untreated |
| 5 | 0.5 | 51 | 5 | Commercial product, untreated |
| 6 | 1 | 52 | 5 | Commercial product, untreated |
| 7 (comp.) | 0.00 | 50 | 60 (60) | Commercial product, untreated |
| 8 (comp.) | 0.00 | 49 | 35 (35) | Commercial product treated according to EP-A 3112 |
| 9 | 0.2 | 51 | 10 (25) | Commercial product, untreated |
| 10 | 0.4 | 50 | 10 (20) | Commercial product, untreated |
| 11 | 0.5 | 51 | 5 (15) | Commercial product, untreated |
| 12 | 1 | 50 | 5 (10) | Commercial product, untreated |

[1]PTMEG: Polytetramethylene ether glycol

I claim:
1. In a process for the preparation of a polytetramethylene ether glycol diester by catalytic polymerization of tetrahydrofuran in the presence of a carboxylic anhydride as a promoter and a bleaching earth as a cationic catalyst, the improvement for reducing the color number of the diester product which comprises:
   carrying out the polymerization in the presence of from 2 to 0.2% by weight, based on the tetrahydrofuran, of a 1,2-alkylene oxide.
2. A process as claimed in claim 1, wherein from 1.5 to 0.5% by weight, based on the tetrahydrofuran, of a 1,2-alkylene oxide is used.
3. A process as claimed in claim 1, wherein the 1,2-alkylene oxide used is ethylene oxide.
4. A process as claimed in claim 1, wherein the carboxylic anhydride used is acetic anhydride.
5. A process as claimed in claim 1, wherein the mixture of tetrahydrofuran, 1,2-alkylene oxide and carboxylic anhydride is brought into contact with the bleaching earth, which is in the form of a fixed catalyst bed.
6. A process as claimed in claim 1, wherein the polymerization is carried out at a reaction temperature of from 30° to 70° C. under atmospheric pressure.

7. A process as claimed in claim 1, wherein a dried bleaching earth is used with a water content which does not exceed 0.2% by weight.

8. A process as claimed in claim 7 wherein the water content of the dried bleaching earth is less than 0.1% by weight.

9. A process as claimed in claim 5 wherein a dried bleaching earth is used with a water content which does not exceed 0.2% by weight.

10. A process as claimed in claim 9 wherein the water content of the dried bleaching earth is less than 0.1% by weight.

11. A process as claimed in claim 1, wherein the 1,2-alkylene oxide used is selected from the group consisting of ethylene oxide and propylene oxide.

12. A process as claimed in claim 11 wherein the 1,2-alkylene oxide is used in an amount of 1.5 to 0.5% by weight, based on the tetrahydrofuran.

13. A process as claimed in claim 1, wherein the polymerization of the tetrahydrofuran is carried out at from 30° to 70° C. under atmospheric pressure in the presence of 1.5 to 0.5% by weight, based on the tetrahydrofuran, of a 1,2-alkylene oxide selected from the group consisting of ethylene oxide and propulene oxide, and using a dried bleaching earth having a water content of less than 0.1% by weight.

14. A process as claimed in claim 13 wherein the 1,2-alkylene oxide is ethylene oxide.

* * * * *

UNITED STATES PATENT AND TRADEMARK OFFICE
CERTIFICATE OF CORRECTION

PATENT NO. : 4,803,299
DATED : February 7, 1989
INVENTOR(S) : Herbert Mueller

It is certified that error appears in the above-identified patent and that said Letters Patent is hereby corrected as shown below:

Column 8, line 12: change "propulene" to --propylene--.

Signed and Sealed this

Twentieth Day of June, 1989

Attest:

DONALD J. QUIGG

Attesting Officer

Commissioner of Patents and Trademarks